United States Patent Office 3,285,072
Patented Nov. 15, 1966

3,285,072
METHOD OF TESTING GRAPHITE
James Ernest Brocklehurst, Southport, England, assignor to United Kingdom Atomic Energy Authority, London, England
Filed July 22, 1963, Ser. No. 296,769
Claims priority, application Great Britain, July 26, 1962, 28,695/62
7 Claims. (Cl. 73—432)

The present invention relates to the testing of polycrystalline graphite for use under irradiation by a flux of neutrons. It is already well known that when graphite is subject to irradiation by neutrons the collisions which occur between the neutrons and the carbon nuclei give rise to the displacement of carbon atoms from their lattice positions. Consequently, changes occur in the crystal dimensions in the $c$ and $a$ axis directions and these crystal changes are reflected macroscopically.

The dimensional change induced by irradiation in the bulk material has made it necessary that graphite for service in a nuclear reactor, for example as a moderator structure, is arranged to accommodate the total amount of irradiation-induced bulk change occurring over the whole working life of the reactor. The way in which a graphite structure for a nuclear reactor is designed and assembled will therefore depend on a prediction of this total amount of change. Thus it may be said that tests from which this prediction can be made are a controlling factor in the manufacture of graphite structures for service in nuclear reactors.

It is possible to establish the irradiation behaviour of the graphite by irradiating samples in a high neutron flux facility at about 150° C. such that a level of irradiation damage equivalent to a whole reactor lifetime of, say, twenty years is achieved in a matter of months. Despite the fact that this possibility can give a reliable life history in a relatively short time, irradiation in a high flux reactor represents a considerable expense, even for such lengths of time, and therefore it is an object of the invention to provide a method of testing graphite by which similar information can be obtained without recourse to such irradiation facilities and thus more cheaply and also more quickly.

According to the present invention, a method of testing polycrystalline graphite for its dimension-determining properties under irradiation by neutrons comprises exposing a sample of the graphite to bromine vapour such that bromine is absorbed progressively in the sample, performing measurements on the sample to ascertain bulk dimensional change as a function of the amount of bromine absorbed, and deducing from such change the extent to which changes in the graphite crystal dimensions are reflected in the bulk, the method being performed without the necessity of recourse to an irradiation facility.

Dimensional changes in the bulk material are known not to reflect fully the changes which occur in the crystal dimensions. This is thought to be due to microporosity which partially accommodates the crystal expansion in the $c$ axis direction. The porosity responsible for this effect can arise as a result of anisotropic crystal contraction during cooling of a mass following graphitization. It is therefore postulated that there is some variable factor, applicable for a given direction in the case of anisotropic material, which governs the macroscopic effect caused by the crystal changes; for convenience such factor is identified hereinafter as A. In practice, this factor A makes allowance for both accommodation by the microporosity and also the degree of preferred orientation of the crystals in the bulk material. It is the variation of this factor A that can be established by means of the invention.

More specifically, according to the present invention, the factor A for a given direction is deduced at different amounts of bromine absorption by means of an expression equating the rate, G, of bulk dimensional change in the same direction per unit uptake of bromine to $$Ag_c + (1-A)g_a$$

in which $g_c$ and $g_a$ are the rates of dimensional change per unit uptake of bromine of a single graphite crystal respectively in the $c$ and $a$ axis directions. Thus, with values of A to show its variation, the irradiation-induced dimensional changes of the single graphite crystal may be translated into the bulk irradiation effects using a similar expression.

The invention is based on the appreciation that a correlation pertains between dimensional change rates due to bromination on the one hand and thermal expansion on the other, so that use can be made of the close relationship now known to exist between thermal expansion and irradiation-induced dimensional change in polycrystalline graphites which have been graphitized to a high degree of crystallographic perfection.

It is a feature of the invention that the values of $g_c$ and $g_a$ to be employed for polycrystalline graphite in the expression above set forth are based on the crystal growth being a linear function of the amount of bromine absorbed and that in terms of percentage length change per unit atomic ratio of bromine to carbon, also on a percentage basis, the values of $g_c$ and $g_a$ are respectively 4.4 and $-0.03$ for small strains. To illustrate these terms further, $g_c$ may be written as:

$$\frac{1}{x_c} \cdot \frac{dx_c}{dB}$$

where $x_c$ is the crystal dimension in the $c$ axis direction and B is the atomic ratio of bromine to carbon. The aforementioned values are found to have a general application at least to a wide range of well-graphitized polycrystalline material; since experiments to ascertain these values have indicated slight variations, they should be regarded as approximations. For higher degrees of crystal strain, appropriate values of $g_c$ and $g_a$ can be evaluated from the previously mentioned figures on the assumption that the growth term (e.g., $dx_c/dB$) remains constant.

To describe the invention further, an example of its application to the prediction of bulk irradiation-induced dimensional change in a given graphite will now be considered with the aid of the accompanying drawings in which are shown the curves drawn at various stages of the method.

The test material of this example is assumed to be an anisotropic graphite and therefore test specimens cut both perpendicular and parallel to the grain of the graphite are employed, the grain being for extruded material in the direction of extrusion and for pressed material perpendicular to the direction of pressing.

Both perpendicular and parallel specimens are brominated at room temperature at a controlled rate in a manner enabling the amount of bulk dimensional change of each specimen to be measured as a function of the amount of bromine absorbed. For example, the graphite specimen may be suspended from a calibrated quartz spring in a glass vacuum apparatus having controllable communication with a bulb containing liquid bromine at room temperature, the specimen length and weight changes being followed with a cathetometer. The results are plotted in FIGURE 1 in terms of percentage length increase against bromine absorption expressed as the atomic percentage of bromine to carbon, the upper curve being for perpendicular specimens and the lower for parallel specimens.

Figure 1:
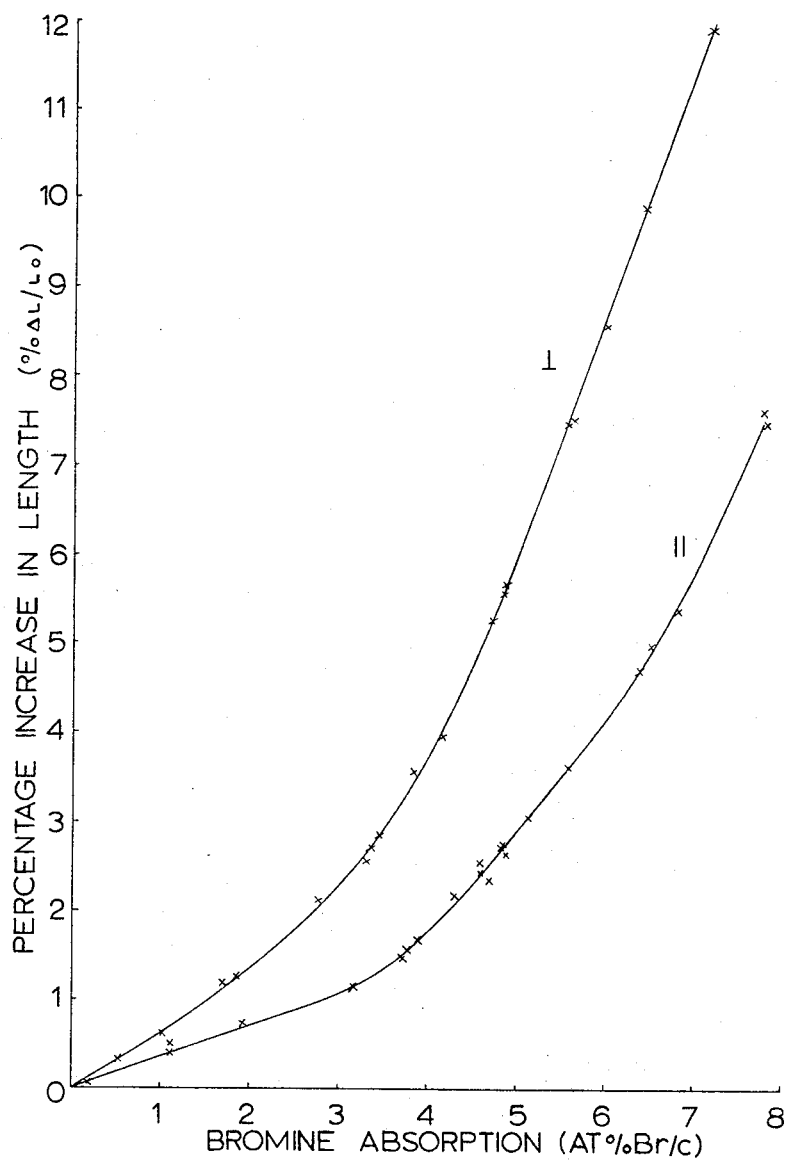
FIGURE 1 shows percentage increase in length as a function of bromine absorption.
Figure 2:
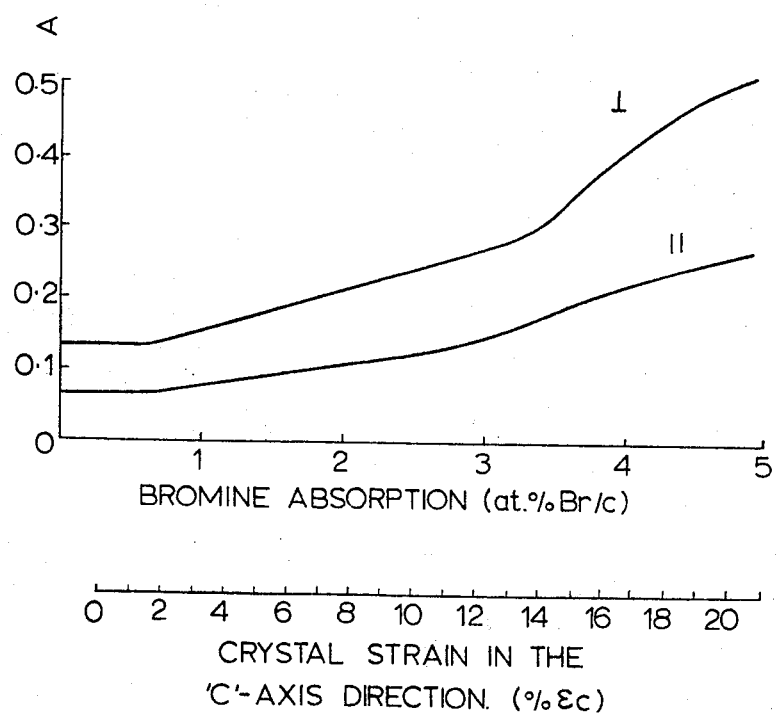
FIGURE 2 shows the value "A" as a function of bromine absorption and $c$ axis crystal strain corresponding to bromine absorption.

From the results shown in FIGURE 1 one obtains the rate, G, of bulk dimensional change per unit uptake of bromine and by means of the previously quoted expression, with the stated values of $g_c$ and $g_a$, the value of A, both in the perpendicular and parallel directions, is deduced as a function of bromine absorption as illustrated in FIGURE 2.

In view of the assumption that $dx_c/dB$ remains constant, it is possible to convert the amount of absorbed bromine into crystal strain in the c axis direction. Thus, the crystal strains corresponding to various levels of bromine absorption are obtained by multiplying the bromine uptake by the initial dimensional change rate of the crystal in the c axis direction, say, 4.4 as previously quoted. Preferably, however, allowance is made for non-expansive surface adsorption of bromine which makes no contribution to dimensional changes in the crystals. This is done by a shift of the crystal strain scale relative to the bromine absorption scale by an amount, equivalent to 1% crystal strain in the present case, which suffices to make the point at which the factor A starts to increase correspond with 2% crystal strain. There is evidence from other sources that A does not increase until the crystal strain reaches 2%. The c axis strain scale added to FIGURE 2 has been shifted in this way.

Having thus derived the change of factor A as a function of c axis strain, the bulk dimensional change due to neutron irradiation can then be predicted, without recourse to irradiation facilities, in conjunction with data on the behaviour of a single graphite crystal under irradiation by neutrons which data is assumed to be available in the form of a set of curves of crystal strain against neutron dose. These curves will be in pairs for different irradiation temperatures, one curve of each pair being in respect of the crystal strain in the c axis direction and the other in respect of the crystal strain in the a axis direction. Such set of curves may be regarded as having general application to all polycrystalline graphites which have been well graphitised since the changes of crystal strain are found to be practically independent of the kind of graphite.

The dependence of the bulk irradiation effect on temperature arises because the net effect of neutron irradiation results from a balance between the rate of production of damage by the neutrons and a concurrently acting process which is due to annealing by thermal activation.

Possible methods by which the crystal data is made available for a given set of irradiation conditions are (i) by irradiation of a pyrolytic graphite which exhibits single crystal dimensional change properties or (ii) by comparison of bromination tests (giving the factor A variation) and the bulk dimensional change under irradiation for nominally identical specimens from a particular graphite. If necessary, interpolations to other irradiation temperatures may be made, as by the method described at page 484 of Nuclear Engineering, December 1962.

Figure 3:
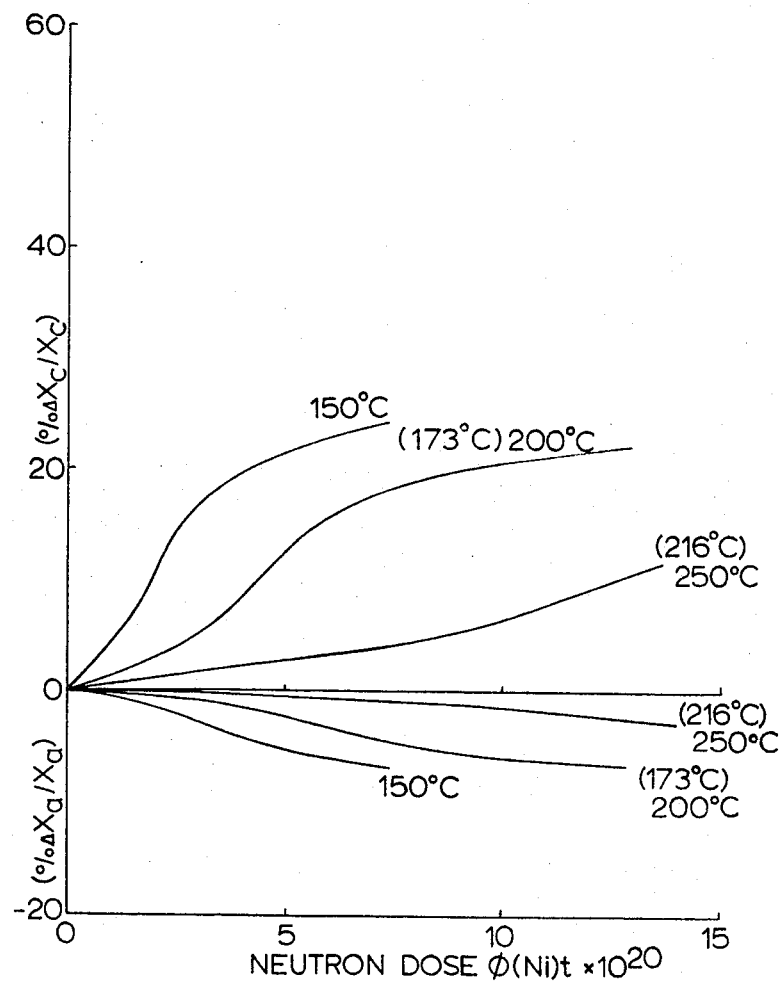
FIGURE 3 is a representation of data showing the rate of dimensional change per unit dose of a graphite crystal respectively in the $c$ and $a$ axis directions corresponding to various values of $c$ axis strain.

Accompanying FIGURE 3 is merely an illustration of the form which this crystal data may take and is not to be regarded as an accurate representation. From data such as this one may obtain for a selected irradiation temperature the rates of dimensional change per unit neutron dose of a graphite crystal respectively in the c and a axis directions corresponding to various values of c axis strain. Using A values obtained for these strains from FIGURE 2 and substituting in the equation previously set forth the bulk rate of dimensional change is obtained. These bulk rates can then be integrated with dose to give the bulk dimensional change for the selected temperature.

Such a prediction of the dimensional change applies, however, only to the particular neutron flux spectrum and flux level on which the crystal data is based. The origin of this data is assumed for present purposes to be a series of irradiations, at the different temperatures indicated in FIGURE 3, in a high flux materials testing reactor of the heavy water moderated and cooled type. Such a reactor provides a neutron flux spectrum and flux level which differs significantly from those in a graphite moderated power reactor for which dimensional change predictions in accordance with the invention have a primary use. Therefore in applying the data from the high flux experimental facilities to the irradiation conditions existing in power producing reactors, allowance must be made for differences in flux spectrum (which determines the dose scale) and for differences in flux level which are allowed for by the concept of equivalent temperatures. Methods for doing this are discussed in detail in a paper by Bell et al. published in the Transactions of the Royal Society, London, Series A, No. 1043, vol. 254, page 361.

In FIGURE 3, the temperatures given in brackets are the equivalent temperatures related to a standard unit of flux defined by the flux produced at the channel wall of a Calder Hall reactor when the adjacent fuel is generating heat at an arbitrarily fixed amount expressed in terms of megawatts per adjacent tonne, i.e., 3.12 mw./a. te. The expression "tonne," of course, refers to a metric ton or 1,000 kg. The flux in the experimental facilities is measured by the activation of nickel by the reaction $^{58}Ni(n,p)^{58}Co$ and, having allowed for differences in flux spectrum, a dose of $1.00 \times 10^{17}{}_n/cm.^2$ of "nickel" flux is taken to be equivalent to a dose of 1 mwd./a. te. at the fuel channel wall of the Calder Hall reactor. A method of computation by which operating temperatures in other designs of reactor are convertible to the same standard is outlined for example in co-pending patent application Serial No. 250,599, filed January 10, 1963, by Bridge and Kelly.

Figure 4:
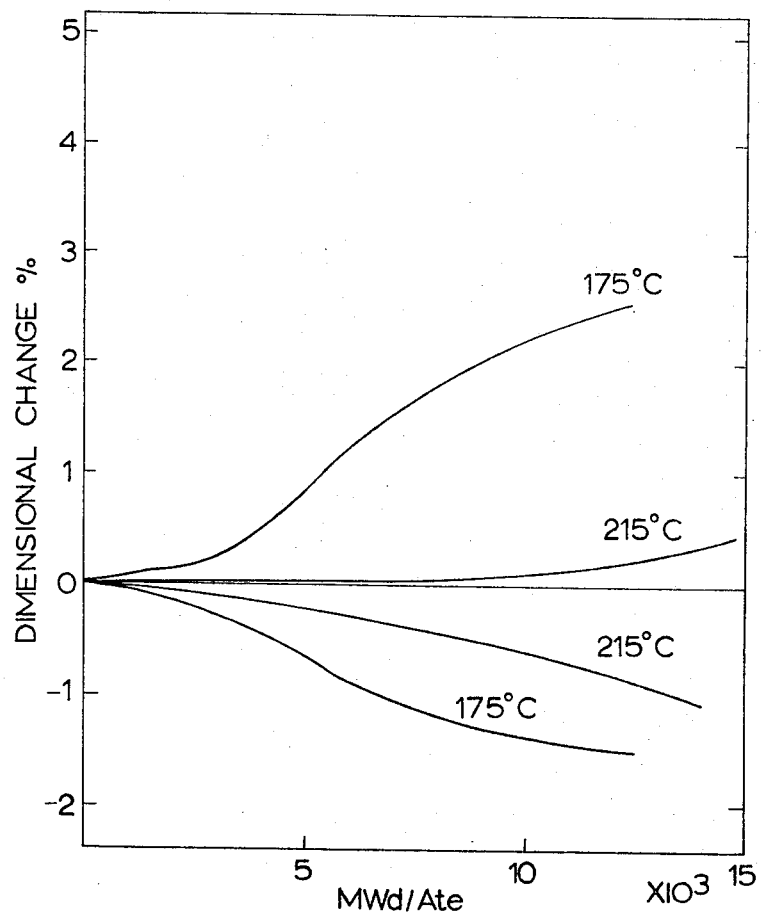
FIGURE 4 shows dimensional change as a function of radiation flux at selected temperatures.

To provide a conclusion for the present example, it is assumed that the bulk dimensional change prediction is desired within equivalent temperature limits of 175 and 215° C. Thus, in FIGURE 4 is shown in the upper half the result for the perpendicular direction in the lower half the result for the parallel direction.

It should be further noted that the factor A which is determined in accordance with the invention is also valid in the following expression by which the bulk thermal expansion coefficient, $\alpha_x$, in a given direction x is related to the crystal coefficients:

$$x = A\alpha_c + (1-A)\alpha_a$$

In this expression the factor A should of course be in respect of the same direction x as the bulk coefficient. With a knowledge of the crystal coefficients, a prediction can therefore be made of the behaviour of the bulk thermal expansion coefficient under neutron irradiation.

By means of the invention predictions of the utmost benefit to the reactor designer can be made cheaply without recourse to irradiation facilities. The test for this purpose is applicable to the evaluation of new types of nuclear grade graphite and also to the checking as a quality control measure of large scale production.

What I claim is:

1. For predicting, without recourse to neutron irradiation facilities, the dimension-determining properties of polycrystalline graphite under irradiation by neutrons, a testing method which comprises exposing a sample of the graphite to bromine vapour such that bromine is absorbed progressively in the sample, performing measurements on the sample to ascertain bulk dimensional change as a function of the amount of bromine absorbed, and deducing from such change the extent to which changes in the graphite crystal dimensions are reflected in the bulk material.

2. For predicting, in respect of a sample of polycrystalline graphite, variation with neutron irradiation of factor A which governs for any given direction in the graphite the extent to which the crystal changes are reflected in the bulk material, a method of testing which comprises exposing the sample to bromine vapour such that bromine is absorbed progressively in the sample, performing measurements on the sample to ascertain bulk dimensional change as a function of the amount of bromine absorbed, deducing values of A by means of an expression equating the rate, G, of bulk dimensional change in the given direction per unit uptake of bromine to $Ag_c+(1-A)g_a$, in which $g_c$ and $g_a$ are the rates of dimensional change per unit uptake of bromine of a single graphite crystal respectively in the $c$ and $a$ axis directions, and correlating the A values with a given neutron flux spectrum on the basis of equal crystal strains.

3. A method of testing polycrystalline graphite as claimed in claim 2 in which the values employed for $g_c$ and $g_a$ are based on the crystal growth being a linear function of the amount of bromine absorbed.

4. A method of testing polycrystalline graphite as claimed in claim 3 in which $g_c$ and $g_a$ are based on initial values of 4.4 and −0.03 respectively, these being in terms of percentage length change per unit atomic ratio of bromine to carbon, also as a percentage.

5. A method of testing polycrystalline graphite as claimed in claim 2 in which the relationship of crystal strain in the $c$ axis direction with the amount of bromine absorbed is adjusted to make allowance for non-expansive surface adsorption of the bromine.

6. A method of testing polycrystalline graphite as claimed in claim 5 in which the crystal strain in the $c$ axis direction is adjusted to make the commencement of said variation correspond to 2% strain.

7. For predicting without recourse to irradiation facilities, the dimensional behaviour of polycrystalline graphite under irradiation in a given neutron flux spectrum, a testing method which comprises exposing a sample of the graphite to bromine vapour such that bromine is absorbed progressively in the sample, performing measurements on the sample to ascertain the amount of bulk dimensional change of the sample in any pre-selected direction as a function of the amount of bromine absorbed, deducing a factor A governing for said direction the bulk effect of changes in the graphite crystal dimensions by means of an expression equating the rate, G, of bulk dimensional change per unit uptake of bromine to $$Ag_c+(1-A)g_a$$

in which $g_c$ and $g_a$ are the rates of dimensional change per unit uptake of bromine of a single graphite crystal respectively in the $c$ and $a$ axis directions, correlating the deduced values of factor A with said neutron flux spectrum on the basis of equal crystal strains thereby to establish the dependence of said values on neutron dose in said spectrum, and applying said values in conjunction with crystal strain data as a function of dose in said spectrum to determine the bulk effects.

References Cited by the Examiner

UNITED STATES PATENTS 3,065,345  11/1962  Le Clerc _____ 250—83.1

OTHER REFERENCES

Stored Energy and Dimensional Changes in Reactor Graphite, by Bridges et al. Proceedings of the Fifth Conference on Carbon, vol. 1, MacMillan Press, New York, 1961, pages 289 to 314.

Kinetics of Graphite-Bromine Reaction, by Hooley. Proceedings of the Third Conference on Carbon, Pergamon Press, New York 1957, pages 347 and 348.

"The Properties of the Interstitial Compounds of Graphite II." The Structure and Stability of Graphite Residue Compounds, by Hennig, The Journal of Chemical Physics, vol. 20, No. 9, September 1952, pages 1438 to 1442.

DAVID SCHONBERG, *Primary Examiner.*

JAMES W. LAWRENCE, *Examiner.*